US011115072B2

(12) United States Patent
Jin (10) Patent No.: US 11,115,072 B2
(45) Date of Patent: Sep. 7, 2021

(54) INTERFERENCE PROCESSING METHOD AND APPARATUS (71) Applicant: XI'AN ZHONGXING NEW SOFTWARE CO. LTD., Shanxi (CN)

(72) Inventor: Haibing Jin, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 0 days.

(21) Appl. No.: 16/641,227

(22) PCT Filed: Aug. 21, 2018

(86) PCT No.: PCT/CN2018/101534
§ 371 (c)(1),
(2) Date: Mar. 22, 2020

(87) PCT Pub. No.: WO2019/037715
PCT Pub. Date: Feb. 28, 2019

(65) Prior Publication Data
US 2020/0220565 A1  Jul. 9, 2020

(30) Foreign Application Priority Data

Aug. 24, 2017 (CN) .......................... 201710736820.0

(51) Int. Cl.
*H04B 17/318* (2015.01)
*H04B 1/12* (2006.01)
*H04B 17/336* (2015.01)

(52) U.S. Cl.
CPC ............. *H04B 1/12* (2013.01); *H04B 17/318* (2015.01); *H04B 17/336* (2015.01)

(58) Field of Classification Search
CPC ...... H04B 1/12; H04B 17/318; H04B 17/336; H04W 8/245; H04W 1/72522; H04M 1/72519
USPC ............................... 370/329; 455/418, 550.1
See application file for complete search history.

(56) References Cited

U.S. PATENT DOCUMENTS

| 2013/0315116 | A1  | 11/2013 | Chen |
| 2014/0081088 | A1* | 3/2014  | Tao ...................... A61B 5/1102 600/301 |
| 2015/0110023 | A1* | 4/2015  | Pan ...................... H04W 52/244 370/329 |
| 2015/0130652 | A1* | 5/2015  | Sugino .................... G01S 13/56 342/27 |

(Continued)

FOREIGN PATENT DOCUMENTS

| CN | 102083119 A | 6/2011 |
| CN | 103780273 A | 5/2014 |

(Continued)

OTHER PUBLICATIONS

CN, Extended Search report and Office Action dated Mar. 11, 2021, CN Application No. 201710736820.0 (Aug. 24, 2017).

*Primary Examiner* — Danh C Le (57) ABSTRACT

Provided are an interference processing method and apparatus. The interference processing method includes: detecting an interference degree of a component of a terminal equipment to the terminal equipment when the component is working; and adjusting component parameters corresponding to the component within a preset range when the interference degree satisfies a preset condition.

10 Claims, 6 Drawing Sheets

(56) References Cited

U.S. PATENT DOCUMENTS

| | | | | |
|---|---|---|---|---|
| 2016/0013816 A1* | 1/2016 | Xia | .......................... | H04B 1/18 |
| | | | | 375/350 |
| 2017/0111857 A1* | 4/2017 | Lightstone | ............ | G01S 5/0205 |
| 2017/0142687 A1* | 5/2017 | Kim | .................. | H04W 72/0453 |
| 2017/0339705 A1* | 11/2017 | Zhao | ..................... | H04W 16/14 |
| 2019/0205244 A1* | 7/2019 | Smith | ..................... | G06F 12/12 |
| 2019/0248390 A1* | 8/2019 | Frucht | ................. | G06K 9/00771 |
| 2019/0373609 A1* | 12/2019 | Kim | ....................... | H04W 36/06 |

FOREIGN PATENT DOCUMENTS

| | | | |
|---|---|---|---|
| CN | 103995969 | A | 8/2014 |
| CN | 104467911 | A | 3/2015 |
| CN | 105979537 | A | 9/2016 |
| CN | 106936515 | A | 7/2017 |
| CN | 107087282 | A | 8/2017 |
| KR | 20100071691 | A | 6/2010 |

\* cited by examiner

INTERFERENCE PROCESSING METHOD AND APPARATUS

TECHNICAL FIELD

The present disclosure relates to but not limited to, the field of wireless communication technology.

BACKGROUND

With the development of wireless communication technology and the wide application of terminal equipment, people raise higher requirements for the design of terminal equipment.

In the current design of terminal equipment, the antenna routing space of the terminal equipment is becoming smaller and smaller, and the distance between the antenna and each component of the terminal equipment is getting closer and closer. When the component works, the interference to the antenna is greater, thereby affecting user experience effect.

SUMMARY

In the first aspect, an embodiment of the present disclosure provides an interference processing method, which includes: detecting an interference degree of a component of a terminal equipment to the terminal equipment when the component is working; adjusting component parameters corresponding to the component within a preset range when the interference degree satisfies a preset condition.

In the second aspect, an embodiment of the present disclosure provides an interference processing apparatus, which includes: a detection module, configured to detect an interference degree of a component of a terminal equipment to the terminal equipment when the component is working; an adjustment module, configured to adjust component parameters corresponding to the component within a preset range when the interference degree detected by the detection module satisfies a preset condition.

In the third aspect, an embodiment of the present disclosure provides an interference processing apparatus, comprising: a storage and a processor; the storage is configured to store executable instructions; the processor is configured to execute the executable instructions stored in the storage, to perform the following operations of: detecting an interference degree of a component of a terminal equipment to the terminal equipment when the component is working; and adjusting component parameters corresponding to the component within a preset range when the interference degree satisfies a preset condition.

In the fourth aspect, an embodiment of the present disclosure provides a computer-readable storage medium, on which computer executable instructions are stored, and the computer executable instructions, when executed by a processor, performs the following operations of: detecting an interference degree of a component of a terminal equipment to the terminal equipment when the component is working; and adjusting component parameters corresponding to the component within a preset range when the interference degree satisfies a preset condition.

BRIEF DESCRIPTION OF THE DRAWINGS

The accompanying drawings are used to provide a further understanding of the technical solution of the present disclosure, and form a part of the specification. The drawings are used to explain the technical solution of the present disclosure together with the embodiments of this application, and do not constitute a limitation of the technical solution of the present disclosure.

DETAILED DESCRIPTION

In order to make the object, technical scheme and advantages of the present disclosure clearer, the embodiments of the present disclosure will be described in detail below with reference to the accompanying drawings. It should be noted that, the embodiments in the present application and the features in the embodiments can be arbitrarily combined with each other without confliction.

With the development of wireless communication technology and the wide application of terminal equipment, people raise higher requirements for the design of terminal equipment.

In the current design of terminal equipment, the antenna routing space of the terminal equipment is becoming smaller and smaller, and the distance between the antenna and each baseband component is getting closer and closer. When the baseband component works, the interference to the antenna is greater, thus affecting the user experience effect. For example, when the components, such as motors, liquid crystal displays (abbreviated as LCDs) and light-sensitive components, etc., of baseband components, are working, they often affect the total isotropic sensitivity (abbreviated as TIS) of the antenna, that is, the performance of the antenna. The reason why baseband components can cause great interference to the antenna of terminal equipment lies in that the sizes of key parameters (such as frequency, current and loudness etc.) of baseband components are not appropriate, which affect the performance index of the antenna. For the key parameters of baseband components, manufacturers will have recommended values, but these recommended values are not necessarily appropriate, which requires the research and development personnel to adjust the key parameters by themselves. The adjustment of key parameters has a certain range, so it is difficult to take into account both the normal realization of baseband component functions and the interference to the antenna during adjusting.

In conclusion, for the terminal equipment in the related technology, due to the large interference of baseband component to the antenna of terminal equipment, the research and development personnel need to adjust the parameters of baseband component by themselves. However, it is difficult for the current adjustment mode of parameters to take into account both the requirements for the normal operation of baseband component and the receiving sensitivity of the antenna.

Therefore, the present disclosure particularly provides an interference processing method and apparatus, which substantially avoids one or more problems caused by the limitations and disadvantages of the related technology.

The technical solution of the present disclosure will be described in detail through specific embodiments. The terminal equipment in the following embodiments of the present disclosure is a terminal configured with an antenna, which can be a mobile terminal, such as a smartphone, tablet, personal digital assistant (PDA) and so on. The following specific embodiments provided by the present disclosure can be combined with each other, and the same or similar concepts or processes may not be repeated in some embodiments.

Figure 1:
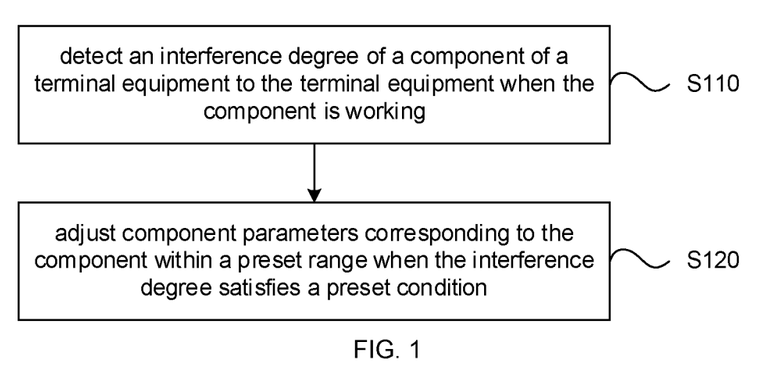
FIG. 1 is a flow chart of an interference processing method according to an embodiment of the present disclosure.

FIG. 1 is a flow chart of an interference processing method according to an embodiment of the present disclosure. The interference processing method provided in this embodiment is applicable to the case of improving the interference caused by the components of the terminal equipment to the antenna. The method can be executed by the interference processing apparatus, which is implemented by a combination of hardware and software. The interference processing apparatus can be integrated into the processor of the terminal equipment for usage of the processor. As shown in FIG. 1, the method of the embodiment of the present disclosure may include the following steps S110 and S120.

At step S110, detecting an interference degree of a component of a terminal equipment to the terminal equipment when the component is working.

The interference processing method provided by the embodiment of the present disclosure is a processing method for reducing the interference effect of the component of the terminal equipment to antenna thereof. The components in the embodiment of the disclosure may be baseband components in the terminal equipment, such as motors, LCDs, light-sensitive components, etc. These components when they are working, will generally cause greater interference to the antenna of the terminal equipment and affect the working performance of the antenna.

In the embodiment of the present disclosure, the terminal equipment may detect the interference degree of each configured component to the terminal equipment when the component is working, specifically the interference degree to the antenna of the terminal equipment. The interference degree may measure whether the size of the interference affects the working performance of the antenna, for example, it may be determined that whether the receiving sensitivity of the antenna is affected according to the interference degree.

It should be noted that the component in the embodiment of the disclosure may refer to a certain component in particular, or one or more components in the terminal equipment. For multiple components in the terminal equipment, the interference degree of each component to the terminal equipment when the component is working may be acquired respectively.

At step S120, adjusting component parameters corresponding to the component within a preset range when the interference degree satisfies a preset condition.

In the embodiment of the present disclosure, the above has explained the interference degree of the detection component to the terminal equipment, and it may detect the interference degree of each component in one or more components to the terminal equipment respectively. Therefore, when adjusting the component parameters, it is necessary to adjust the component parameters corresponding to each component whose interference degree meets the preset condition, that is, the component parameters to be adjusted are the parameters corresponding to a certain component. For example, when the component is a motor, the component parameter may be a frequency; when the component is an LCD, the component parameter may be a current. In addition, one component may correspond to multiple component parameters. In practical application, if the interference degrees of three components (component 1, component 2 and component 3) to the terminal equipment are detected, herein the interference degree caused by the component 1 does not meet the preset condition, and the interference degrees caused by the component 2 and the component 3 meet the preset condition; since the interference degree caused by the component 1 does not meet the preset condition, it indicates that the interference degree caused by the component 1 when it is working with the current component parameter values has little influence on the antenna sensitivity, and the current component parameter values may not need to be adjusted; since the interference degrees caused by the component 2 and the component 3 have met the preset condition, it indicates that the interference degrees caused by the component 2 and the component 3 when they are working with the current component parameter values have a greater influence on the antenna sensitivity. At this time, the component parameters corresponding to the component 2 and the component 3 may be adjusted respectively, so that when the component 2 and the component 3 work with the adjusted device parameter values, the interference degrees to the terminal equipment are reduced, i.e. the interference degrees no longer meet the preset condition. In general, during adjustment, a component parameter value with the smallest interference degree to the antenna may be selected as the adjustment target value.

It should be noted that the preset range in the embodiment of the disclosure is a range for which a certain component may work normally, and is usually provided by the component manufacturer. For example, when the component is a motor, the preset range may be a frequency range.

When the terminal equipment of related technology detects that its antenna is greatly affected by component interference, component parameters may only be adjusted artificially, i.e. manually. This adjustment manner needs to be operated by research and development personnel with professional skills. However, after users purchase and use terminal equipment, it is difficult to reduce the interference to the antenna by adjusting the component parameters by themselves if it is found that the antenna is subject to strong interference. In addition, since the normal operation of the component needs to be within a reasonable range of component parameters, it is difficult for the research and development personnel to adjust the component parameters manually, and meanwhile, it is difficult to take into account both the requirements of the normal operation of the component and the receiving sensitivity of the antenna.

In contrast, the interference processing method provided by the embodiment of the present disclosure may automatically adjust the component parameters only when the interference of the component to the terminal equipment reaches a certain degree, that is to say, whether the device parameters being adjusted is determined by judging whether the interference degree meets the preset condition. On the one hand, it is known through reasonable preset conditions that whether the interference to the antenna of the terminal equipment reaches the condition required for adjustment, and the judgment is executed by the terminal equipment, thereby having unified standards and avoiding subjectivity of human judgment; on the other hand, different components correspond to different component parameters, it is necessary to judge which components cause interference and which component parameters need to be adjusted if the component parameters are manually adjusted by the research and development personnel. These judgments will increase the complexity of manually adjusting the component parameters, and there will be a possibility of misjudgment, thereby causing the situation that antenna performance may not be improved. Through acquiring the interference degree caused by different components in the embodiment of the present disclosure, the component parameters corresponding to the components whose interference degree meets the preset conditions are adjusted targetedly. It may be clear which device parameters may be adjusted, which may reduce the interference caused by the component operation to the antenna, and may improve the receiving sensitivity of the antenna.

In the interference processing method provided by the embodiment of the present disclosure, the interference degree of a component of a terminal equipment to the terminal equipment when the component is working is detected, and component parameters corresponding to the component within a preset range are adjusted when the detected interference degree meets a preset condition. The above adjusted component parameters are parameters corresponding to components whose interference degrees meet the preset conditions, i.e. the component parameters subjected to adjustment have reasonable basis and standards, and the operation of automatically adjusting component parameters by terminal equipment may be realized according to the preset conditions. In addition, adjusting the component parameters within the preset range may ensure the normal operation of the component. The method provided by the embodiment of the disclosure may not only reduce the interference caused by the component operation to the antenna, improve the receiving sensitivity of the antenna, but also ensure the normal operation of the component, and solves the problem that it is difficult to take into account both the normal operation of the baseband component and the receiving sensitivity of the antenna using the mode of adjusting the component parameters of the terminal equipment in the related technology.

Figure 2:
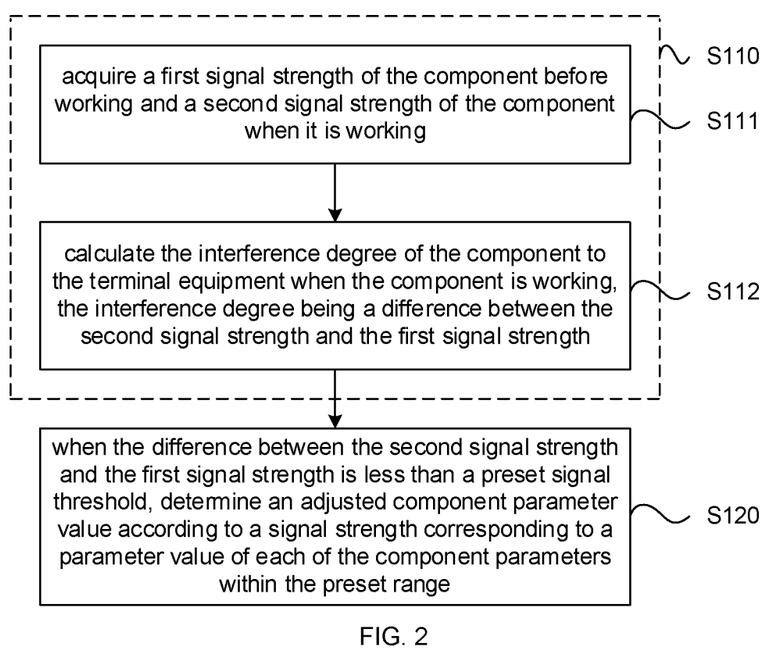
FIG. 2 is a flow chart of another interference processing method according to an embodiment of the present disclosure.

FIG. 2 is a flow chart of another interference processing method according to an embodiment of the present disclosure. On the basis of the above embodiment described with reference to FIG. 1, the implementation of S110 in the embodiment of the present disclosure may include steps S111 and S112.

At step S111, acquiring a first signal strength of the component before working and a second signal strength of the component when it is working.

At step S112, calculating the interference degree of the component to the terminal equipment when the component is working, the interference degree being a difference between the second signal strength and the first signal strength.

In the embodiment of the present disclosure, the interference degree of the component to the terminal equipment may be determined by using the signal strength, for example, the influence degree to the antenna may be determined based on the strength of the network signal obtained by the terminal equipment. The above signal strength may be received signal code power (short for: RSCP) in the 3rd generation mobile communication (short for: 3G) network, or reference signal receiving power (short for: RSRP) in the long term evolution (short for: LTE) network, or received signal strength indication (short for: RSSI) in the code division multiple access (short for: CDMA) network, or may also be parameters used to indicate signal strength in other networks.

In the following embodiments of the present disclosure, taking signal strength as RSCP as an example, before a certain component starts to work, the feedback value of the terminal equipment is recorded as the first signal strength (i.e. the first RSCP); when the component starts to work, the feedback value of the terminal equipment is recorded as the second signal strength (i.e. the second RSCP). Then, the difference between the second RSCP when the component is working and the first RSCP before the component works is compared, and the difference (the difference between the second RSCP and the first RSCP) is the interference degree of the component to the terminal equipment when the component is working.

In some embodiments, the implementation of step S120 may include: when the difference between the second signal strength and the first signal strength is less than a preset signal threshold, determining an adjusted component parameter value according to a signal strength corresponding to a parameter value of each of the component parameters within the preset range.

In the above embodiments of the present disclosure, it has been explained that the interference degree is the difference between the second signal strength and the first signal strength. After acquiring the difference, when the difference is less than the preset signal threshold, it is indicated that the antenna is subject to strong interference after the component works, and it needs to dynamically adjust the component parameters corresponding to the component until the difference between the signal strengths corresponding to the adjusted component parameter values is greater than or equal to the above preset threshold, which reduces the interference degree of the component to the antenna.

In some embodiments, in step S120, the implementation of determining the adjusted component parameter value according to the signal strength corresponding to the parameter value of each of the component parameters within the preset range may include: traversing all parameter values of the component parameters within the preset range, acquiring a signal strength for each of the parameter values, and using a parameter value corresponding to a maximum value of the signal strength as the adjusted component parameter value.

In the embodiment of the present disclosure, the adjustment of the component parameters is actually a dynamic adjustment process, the dynamic adjustment may include: taking different parameter values within a preset range of the component parameters, comparing the signal strengths corresponding to the different parameter values, and finding out the parameter values corresponding to the signal strength (i.e., the maximum signal strength) that causes the least interference to the antenna, and using the parameter values as adjusted device parameter values.

It should be noted that if fixed steps are added to or subtracted from a certain parameter value in a simple form only for the adjustment of component parameters, the adjustment mode is limited and not precise enough. Improper adjustment will affect the actual experience of users, and it is difficult to obtain the minimum interference impact on the antenna. Therefore, in the embodiment of the present disclosure, the signal strength is taken as the basis, and the influence degree of the parameter value on the antenna is judged according to the corresponding relation between the parameter value and the signal strength, so as to take into account both the normal operation of the component and the receiving sensitivity of the antenna.

Figure 3:
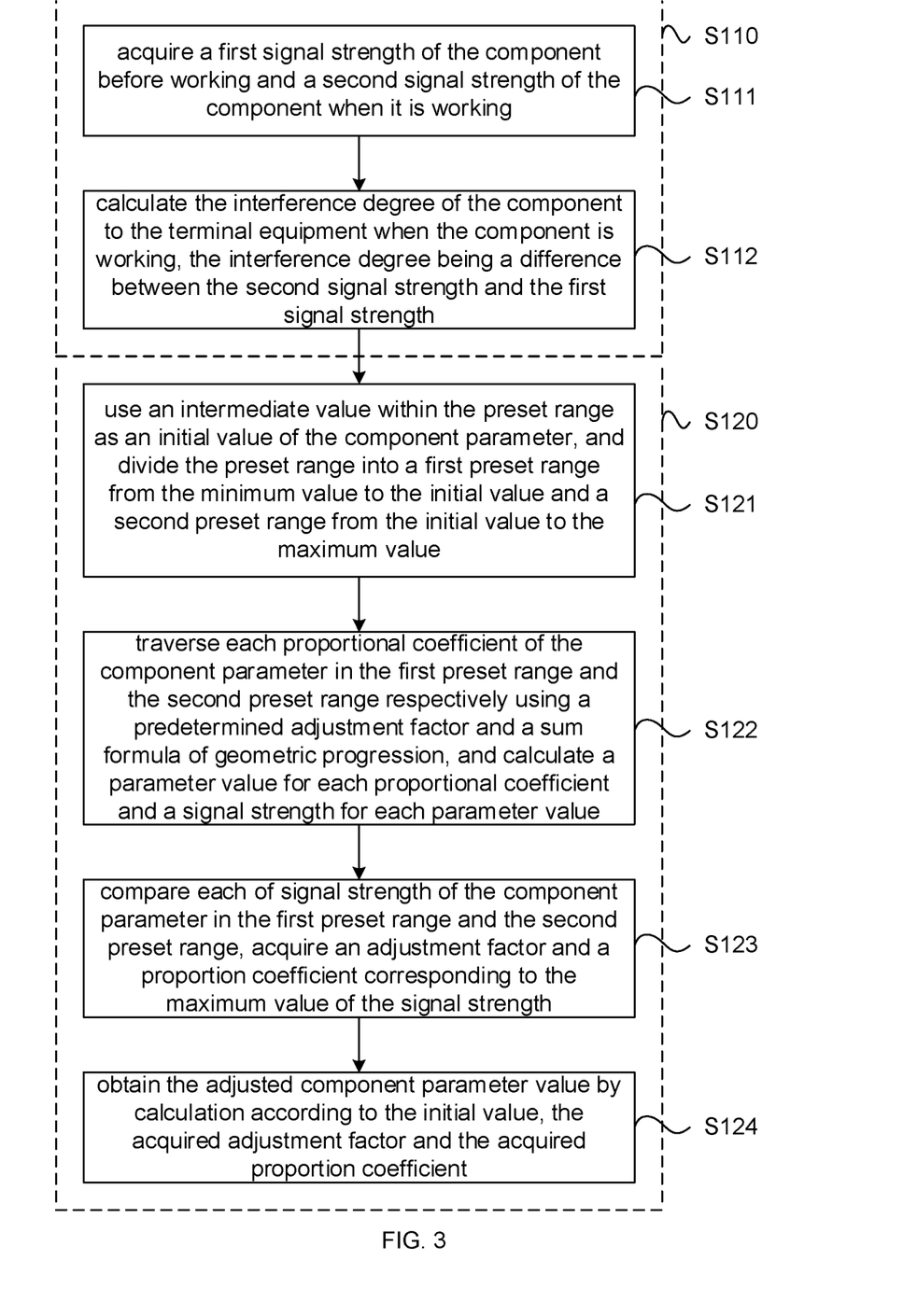
FIG. 3 is a flow chart of yet another interference processing method according to an embodiment of the present disclosure.

FIG. 3 is a flow chart of yet another interference processing method according to an embodiment of the present disclosure. In the embodiment of the present disclosure, it has been explained in the above that the preset range is a range provided by the manufacturer. In fact, it may be a range from a minimum value to a maximum value of component parameter when a certain component works normally, for example, the preset range of component parameter of a certain component is [a, b]. In some embodiments, the implementation of step S120 may include steps S121 to S124.

At step S121, when the difference between the second signal strength and the first signal strength is less than the preset signal threshold, using an intermediate value within the preset range as an initial value of the component parameter, and dividing the preset range into a first preset range from the minimum value to the initial value and a second preset range from the initial value to the maximum value.

At step S122, traversing each proportional coefficient of the component parameter in the first preset range and the second preset range respectively using a predetermined adjustment factor and a sum formula of geometric progression, and calculating a parameter value for each proportional coefficient and a signal strength for each parameter value, herein the sum formula of geometric progression is:

$$\sum_{i=0}^{n} S_n = a_1 + a_1 q + a_1 q^2 + L + a_1 q^n = \frac{a_1(1-q^n)}{1-q}; \quad (1)$$

herein, in the above formula (1), q is the adjustment factor and n is the proportion coefficient; when n approaches infinity, the sum of the first n terms tends to be a constant, i.e.

$$\lim_{n \to \infty} \sum_{i=0}^{n} S_n = \frac{a_1}{1-q};$$

the initial value of the component parameters when the component is working, and the adjustment factor q (absolute value is less than 1) may be defined according to the sum formula of geometric progression. When the component is working, the component parameters may be smoothly adjusted by using formula (1), so that the user experience may be smoothly adjusted until the requirement for the receiving sensitivity of the antenna is met, and the interference of the component to the antenna is reduced. In addition, when the adjustment factor q is a negative number, the adjustment in the opposite direction may be realized to ensure that the component parameters may be adjusted within the preset range [a, b], that is, to ensure that there is no omission in the adjustment of the component parameters.

At step S123, matching each of signal strength of the component parameter in the first preset range and the second preset range, acquiring an adjustment factor and a proportion coefficient corresponding to the maximum value of the signal strength.

At step S124, obtaining the adjusted component parameter value by calculation according to the initial value, the acquired adjustment factor and the acquired proportion coefficient.

Figure 4:
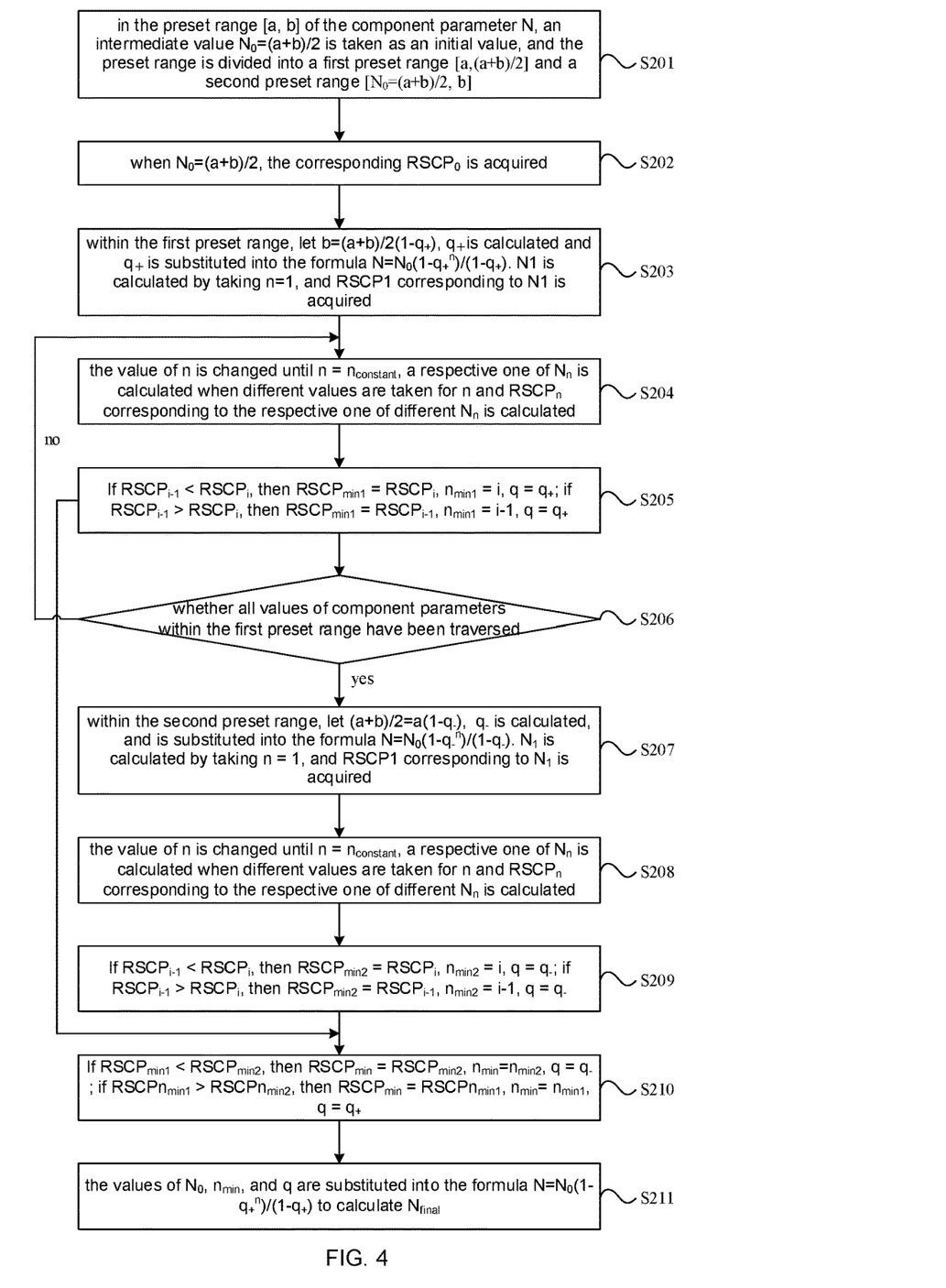
FIG. 4 is a flow chart of adjusting component parameters in an interference processing method according to an embodiment of the present disclosure.

The implementation of dynamic adjustment of component parameters in the embodiment of the present disclosure is described in detail below. FIG. 4 is a flow chart of adjusting component parameters in an interference processing method according to an embodiment of the present disclosure. In one embodiment, the process of dynamically adjusting component parameters may include the following steps S201 to S211.

At step S201, in the preset range [a, b] of the component parameter N, an intermediate value $$N_0 = \frac{a+b}{2}$$

is taken as an initial value, and the preset range is divided into a first preset range $$\left[a, \frac{a+b}{2}\right]$$

and a second preset range $$\left[\frac{a+b}{2}, b\right].$$

In the embodiment of the disclosure, the component parameters are dynamically adjusted through the sum formula of geometric progression. In the above formula (1), if q is a positive number or a negative number, the positive and negative of $q^n$ are different. Therefore, the preset range [a, b] of the component parameters may be divided, and the positive and negative of q are the same in the same range.

At step S202, when $$N_0 = \frac{a+b}{2},$$

the corresponding $RSCP_0$ is acquired.

At step S203, within the first preset range, let $$b = \frac{a+b}{2(1-q_+)},$$

$q_+$ is calculated and $q_+$ is substituted into the formula $$N = \frac{N_0(1 - q_+^n)}{1 - q_+}.$$

N1 is calculated by taking n=1, and RSCP1 corresponding to N1 is acquired.

In this embodiment, the value is taken within the first preset range, where q is a positive number $q_+$ with an absolute value being less than 1. In the above formula (1), let $$S_n = N = b, a_1 = \frac{a+b}{2}, \text{ then } b = \frac{a+b}{2(1-q_+)}$$

is acquired. At this time, $N_1$ is the same as the above initial value $N_0$. It should be noted that the calculated $q_+$ in this step is the predetermined adjustment factor in the above embodiment. When traversing each proportionality coefficient in the first round, parameter value and corresponding signal strength is calculated using the calculated $q_+$ here.

At step S204, the value of n is changed until $n=n_{constant}$, a respective one of $N_n$ is calculated when different values are taken for n and $RSCP_n$ corresponding to the respective one of different $N_n$ is calculated.

In this embodiment, when changing the value of n, it is necessary to satisfy that the value of N is within the first preset range, i.e. q is guaranteed to $q_+$. If a value is taken from N=b, $n_{constant}$ may be the value of n when n is greater than or equal to $$\frac{a+b}{2}.$$

At step S205, $RSCP_{i-1}$ is compared with $RSCP_i$ in magnitude. If $RSCP_{i-1}<RSCP_i$, then $RSCP_{min1}=RSCP_i$, $n_{min1}=i$, $q=q_+$; if $RSCP_{i-1}>RSCP_i$, then $RSCP_{min1}=RSCP_{i-1}$, $n_{min1}=i-1$, $q=q_+$; herein i is from 1 to $n_{constant}$.

After traversing all N values within the first preset range, traversing of all N values within the second preset range may be started.

At step S206, it is judged whether all values of component parameters within the first preset range have been traversed. If not, the process returns to step S204; if completed, the process goes to step S207.

At step S207, within the second preset range, let $$\frac{a+b}{2} = \frac{a}{1-q_-},$$

$q_-$ is calculated, and is substituted into the formula $$N = \frac{N_0(1 - q_-^n)}{1 - q_-}.$$

N1 is calculated by taking n=1, and RSCP1 corresponding to $N_1$ is acquired.

In this embodiment, the value is taken within the second preset range, where q is a negative number $q_-$ with an absolute value being less than 1. In the above formula (1), let $$S_n = N = b, a_1 = \frac{a+b}{2}, \text{ then } \frac{a+b}{2} = \frac{a}{1-q_-},$$

$N_1$ at this time is the same as the above initial value $N_0$. It should be noted that the calculated $q_-$ in this step is the predetermined adjustment factor in the above embodiment. When traversing each proportionality coefficient in the first round, parameter value and corresponding signal strength are calculated using the calculated $q_-$ here.

At step S208, the value of n is changed until $n=n_{constant}$, a respective one of $N_n$ is calculated when different values are taken for n and $RSCP_n$ corresponding to the respective one of different $N_n$ is calculated.

In this embodiment, when the value of n is changed, it is necessary to satisfy that the value of N is within the second preset range, i.e. q is guaranteed to $q_-$. If the value is taken from N=a, $n_{constant}$ may be the value of n when n is less than or equal to $$\frac{a+b}{2}.$$

At step S209, $RSCP_{i-1}$ is compared with $RSCP_i$ in magnitude. If $RSCP_{i-1}<RSCP_i$, then $RSCP_{min2}=RSCP_i$, $n_{min2}=i$, $q=q_-$; if $RSCP_{i-1}>RSCP_i$, then $RSCP_{min2}=RSCP_{i-1}$, $n_{min2}=i-1$, $q=q_-$; herein i is from 1 to $n_{constant}$.

After performing steps S205 and step S209, it is necessary to continue to compare the magnitude of $RSCP_{min1}$ and $RSCP_{min2}$ to determine a final value of component parameters.

At step S210, $RSCP_{min1}$ is compared with $RSCP_{min2}$ in magnitude. If $RSCP_{min1}<RSCP_{min2}$, then $RSCP_{min}=RSCP_{min2}$, $n_{min}=n_{min2}$, $q=q_-$; if $RSCPn_{min1}>RSCPn_{min2}$, then $RSCP_{min}=RSCPn_{min1}$, $n_{min}=n_{min1}$, $q=q_+$.

In the embodiment of the disclosure, within the preset range [a, b], each N corresponds to a respective RSCP, and it is necessary to find out the N corresponding to the maximum value of RSCP. When the RSCP is the maximum value, it means that the component has the minimum impact on the antenna.

At step S211, the values of $N_0$, $n_{min}$, and q are substituted into the formula $$N = \frac{N_0(1 - q_+^n)}{1 - q_+}$$

to calculate $N_{final}$.

It should be noted that the example shown in FIG. 4 is to traverse the parameter values in the first preset range and then the parameter values in the second preset range as an example. In actual application, the parameter values in the second preset range may be traversed first, and then the parameter values in the first preset range may be traversed. At this time, step S206 is to judge whether all values of component parameters in the second preset range have been traversed.

In some embodiments, after step S203 and step S207, the method may further include: modifying the adjustment factor when the calculated parameter value is not within the preset range; traversing all proportional coefficients of the component parameter in the first preset range and the second preset range respectively using the modified adjustment factor and the sum formula of geometric progression, and calculating the parameter value for each proportional coefficient and the signal strength for each parameter value.

In steps S204 and S208 of this embodiment, after N is calculated by changing the value of n, if N calculated based on a certain value of n has exceeded the first preset range or the second preset range, the adjustment factor at this time may be modified, and then steps S203 to S205 and steps S207 to S209 may be re-executed.

In practical application, the q calculated in the initial steps S203 and S207 is a predetermined adjustment factor, and the absolute value of the q value is less than 1. If the q value is calculated to be 0.5, the adjustment factor may be modified in a preset step size. For example, if the preset step size is 0.1, the q value may be increased or decreased in a step size of 0.1. During each round of traversal, when the calculated N is not within the preset range, the q value is modified by once until q traverses all values between (0,1).

The $N_{final}$ in this embodiment is the final determined component parameter value. In this embodiment, a respective signal strength (RSCP) corresponding to each parameter value is obtained by traversing all the values of the component parameter in the preset range and actually traversing through the proportion coefficient n. The adjustment factor q and the proportion coefficient $n_{min}$ corresponding to the value (i.e. the maximum value of RSCP) that causes the least interference to the antenna by RSCP are used as the basis for determining the component parameter, thereby obtaining the adjusted component parameter value, i.e., the component parameter value that has the least influence on the antenna. Obviously, the embodiment of the present disclosure does not simply adjust the component parameters by adding and subtracting fixed steps based on a certain parameter value, but combine the interference degree generated by the component under different parameter values to obtain the component parameter value having least impact on the antenna, in consideration with the minimum interference degree as a standard. In this manner, it is ensured not only the component parameters are within the range specified by the manufacturer, i.e. the normal operation of the component, but also the receiving sensitivity of the antenna.

Figure 5:
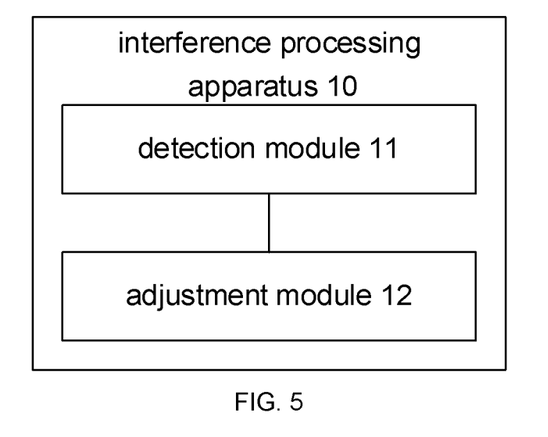
FIG. 5 is a schematic structural diagram of an interference processing apparatus according to an embodiment of the present disclosure.

FIG. 5 is a schematic structural diagram of an interference processing apparatus according to an embodiment of the present disclosure. The interference processing apparatus provided in this embodiment is suitable for improving the interference caused by the component of the terminal equipment to the antenna. The interference processing apparatus is implemented by combining hardware and software. The interference processing apparatus may be integrated into the processor of the terminal equipment for the use of the processor. As shown in FIG. 5, the interference processing apparatus 10 of this embodiment may include a detection module 11 and an adjustment module 12.

The detection module 11 may be configured to detect an interference degree of a component of a terminal equipment to the terminal equipment when the component is working.

The interference processing apparatus 10 provided in the embodiment of the present disclosure is used to execute a processing for reducing interference effects of components of terminal equipment on antenna thereof. The components in the embodiments of the present disclosure may be baseband components in the terminal equipment, such as motors, LCDs, light-sensitive devices, etc. These components will usually bring greater interference to the antenna of the terminal equipment and affect the working performance of the antenna when they are working.

In the embodiment of the present disclosure, the detection module 11 may detect the interference degree of each component configured in the terminal equipment to the terminal equipment when the component is working, specifically, the interference degree to the antenna of the terminal equipment. It is indicated by the interference degree that whether the interference size affects the working performance of the antenna, for example, it may be determined according to the interference degree whether the receiving sensitivity of the antenna is affected.

It should be noted that the components in the embodiment of the present disclosure may refer to a specific component or one or more components in the terminal equipment. For a plurality of components in the terminal device, the interference degree of each component to the terminal equipment when the component is working may be acquired respectively.

The adjustment module 12 may be configured to adjust component parameters corresponding to the component within a preset range when the interference degree detected by the detection module 11 satisfies a preset condition.

In the embodiment of the present disclosure, the above has explained the interference degree of the detection module 11 of the detection component to the terminal equipment, and it may detect the interference degree of each component from one or more components to the terminal equipment respectively. Therefore, when the adjustment module 12 adjusts the component parameters, it is necessary to adjust the respective component parameters corresponding to each component whose interference degree meets the preset conditions. That is, the component parameters to be adjusted are the parameters corresponding to a certain component. For example, when the component is a motor, the component parameter may be a frequency, when the component is an LCD, the component parameter may be a current. In addition, one component may correspond to multiple component parameters. In practical application, if the detection module 11 detects the interference degrees of three components (component 1, component 2 and component 3) to the terminal equipment, herein the interference degree caused by the component 1 does not meet the preset condition, and the interference degrees caused by the component 2 and the component 3 meet the preset condition; since the interference degree caused by the component 1 does not meet the preset condition, it indicates that the interference degree caused by the component 1 when it is working at the current component parameter values has little influence on the antenna sensitivity, and the adjustment module 12 may not need to adjust the current component parameter values. Since the interference degrees caused by the component 2 and the component 3 have met the preset condition, it indicates that the interference degrees caused by the component 2 and the component 3 when they are working at the current component parameter values have a greater influence on the antenna sensitivity. At this time, the adjustment module 12 may adjust the component parameters corresponding to the component 2 and the component 3 respectively, so that when the component 2 and the component 3 work under the adjusted component parameter values, the interference degrees to the terminal equipment are reduced, i.e. the interference degrees no longer meet the preset condition. In general, when the adjustment module 12 makes an adjustment, a component parameter value with the smallest interference degree to the antenna may be selected as the adjustment target value.

It should be noted that the preset range in the embodiment of the disclosure is a range when a certain component may work normally, and is usually provided by the component manufacturer. For example, when the component is a motor, the preset range may be a frequency range.

When the terminal equipment of related technology detects that its antenna is greatly affected by component interference, component parameters may only be adjusted artificially, i.e. manually. This adjustment manner needs to be operated by research and development personnel with professional skills. However, after users purchase and use terminal equipment, it is difficult to reduce the interference to the antenna through adjusting the component parameters by themselves if it is found that the antenna is subject to strong interference. In addition, since the normal operation of the component needs to be within a reasonable range of component parameters, it is difficult for the research and development personnel to adjust the component parameters manually. Meanwhile, it is difficult to take into account the requirements for the normal operation of the component and the receiving sensitivity of the antenna.

In contrast, the interference processing apparatus 10 provided by the embodiment of the present disclosure may automatically adjust the component parameters only when the interference of the component to the terminal equipment reaches a certain degree, that is to say, whether the device parameters being adjusted is determined by judging whether the interference degree meets the preset condition. On the one hand, it is known through reasonable preset conditions that whether the interference to the antenna of the terminal equipment reaches the condition required for adjustment, and the judgment is executed by the terminal equipment, thereby having unified standards and avoiding subjectivity of human judgment; on the other hand, different components correspond to different component parameters, it is necessary to judge which components cause interference and which component parameters need to be adjusted if the component parameters are manually adjusted by the research and development personnel. These judgments will increase the complexity of manually adjusting the component parameters, and there will be a possibility of misjudgment, thereby causing the situation that antenna performance may not be improved. Through acquiring the interference degree caused by different components in the embodiment of the present disclosure, the component parameters corresponding to the components whose interference degree meets the preset conditions are adjusted targetedly. It may be clear which device parameters may be adjusted, which may reduce the interference caused by the component operation to the antenna, and may improve the receiving sensitivity of the antenna.

The interference processing apparatus 10 provided in the embodiment of the present disclosure is used to execute the interference processing method provided in the embodiment of FIG. 1 of the present disclosure, and has corresponding functional modules. Its implementation principle and technical effect are similar, and will not be described here again.

Figure 6:
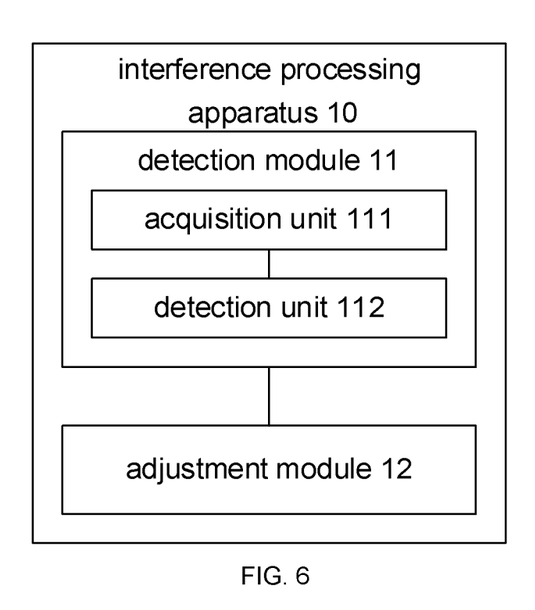
FIG. 6 is a schematic structural diagram of an interference processing apparatus according to an embodiment of the present disclosure.

FIG. 6 is a schematic structural diagram of another interference processing apparatus according to an embodiment of the present disclosure. On the basis of the above described embodiment with reference to FIG. 5, the detection module 11 in the embodiment of the present disclosure may include: an acquisition unit 111, configured to acquire a first signal strength of the component before working and a second signal strength of the component when it is working; and a detection unit 112, configured to calculate an interference degree of the component to the terminal equipment when the component is working, and the interference degree is a difference between the second signal strength and the first signal strength acquired by the acquisition unit 111.

In the embodiment of the present disclosure, the interference degree of the component to the terminal equipment may be determined through the signal strength, for example, the influence degree on the antenna may be determined based on the strength of the network signal obtained by the terminal equipment. The above signal strength may be RSCP in the 3G network, or RSRP in the LTE network, or RSSI in the CDMA network, or may also be parameters used to indicate signal strength in other networks.

In the following embodiments of the present disclosure, taking signal strength as RSCP as an example, before a certain component starts to work, the feedback value of the terminal equipment is recorded as the first signal strength (i.e. the first RSCP); when the component starts to work, the feedback value of the terminal equipment is recorded as the second signal strength (i.e. the second RSCP). Then, the difference between the second RSCP when the component is working and the first RSCP before the component works is compared, and the difference (the difference between the second RSCP and the first RSCP) is the interference degree of the component to the terminal equipment when the component is working.

In some embodiments, when the interference degree meets the preset conditions, the implementation of adjusting by the adjustment module 12 the component parameters corresponding to the component within the preset parameter range may include: when the difference between the second signal strength and the first signal strength is less than a preset signal threshold value, determining an adjusted component parameter value according to a signal strength corresponding to a parameter value of each of the component parameters within the preset range.

In the above embodiment of the present disclosure, it has been explained that the interference degree is the difference between the second signal strength and the first signal strength. After the acquisition unit 111 acquires the difference, it is indicated, when the difference is less than the preset signal threshold that the antenna is subject to strong interference upon the component works, and the adjusting module 12 needs to dynamically adjust the component parameters corresponding to the component until the difference between the signal strengths corresponding to the adjusted component parameter values is greater than or equal to the preset threshold, which reduces the interference degree of the component to the antenna.

In some embodiments, the implementation of determining by the adjustment module 12 the adjusted component parameter value according to the signal strength corresponding to the parameter value of each of the component parameters within the preset range may include: traversing all parameter values of the component parameters within the preset range, acquiring a signal strength for each of the parameter values, and using a parameter value corresponding to a maximum value of the signal strength as the adjusted component parameter value.

In the embodiment of the present disclosure, the adjustment of the component parameters by the adjustment module 12 is actually a dynamic adjustment process, the dynamic adjustment may include: taking different parameter values within a preset range of the component parameters, comparing the signal strengths corresponding to the different parameter values, and finding out the parameter values corresponding to the signal strength (i.e., the maximum signal strength) that causes the least interference to the antenna, and using the parameter values as adjusted device parameter values.

It should be noted that if fixed steps are added to or subtracted from a certain parameter value in a simple form only for the adjustment of component parameters, the adjustment mode is limited and not precise enough. Improper adjustment will affect the actual experience of users, and it is difficult to obtain the minimum interference impact on the antenna. Therefore, in the embodiment of the present disclosure, the signal strength is taken as the basis, and the influence degree of the parameter value on the antenna is judged according to the corresponding relation between the parameter value and the signal strength, so as to take into account both the normal operation of the component and the receiving sensitivity of the antenna.

The interference processing apparatus 10 provided in the embodiment of the present disclosure is used to execute the interference processing method provided in the embodiment of FIG. 2 of the present disclosure, and has corresponding functional modules. Its implementation principle and technical effect are similar, and will not be described here again.

Figure 7:
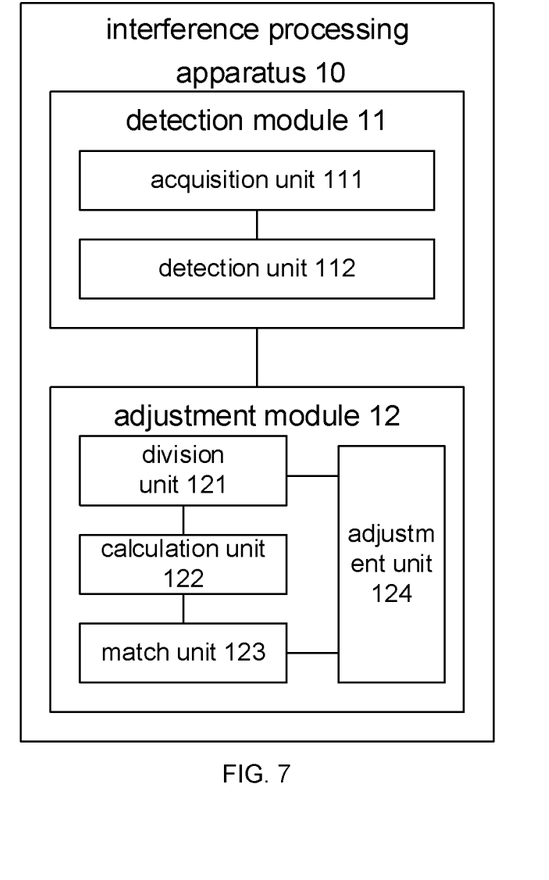
FIG. 7 is a schematic structural diagram of an interference processing apparatus according to an embodiment of the present disclosure.

FIG. 7 is a schematic structural diagram of yet another interference processing apparatus according to an embodiment of the present disclosure. In the embodiment of the present disclosure, it has been explained that the preset range is a range provided by the manufacturer, and may actually be a range from a minimum value to a maximum value of component parameter when a certain component is in normal operation. For example, the preset range of the component parameter of a certain component is [a, b]. In some embodiments, the adjustment module 12 may include: a division unit 121, a calculation unit 122, a match unit 123, and an adjustment unit 124.

The division unit 121 is configured to use an intermediate value within the preset range as an initial value of the component parameter when the difference between the second signal strength and the first signal strength is less than the preset signal threshold, and divide the preset range into a first preset range from the minimum value to the initial value and a second preset range from the initial value to the maximum value.

The calculation unit 122 is configured to traverse respectively each proportional coefficient of the component parameter in the first preset range and the second preset range divided by the division unit 121 using a predetermined adjustment factor and a sum formula of geometric progression, and calculate a parameter value for each proportional coefficient and a signal strength for each parameter value, herein the sum formula of geometric progression is:

$$\sum_{i=0}^{n} S_n = a_1 + a_1 q + a_1 q^2 + L + a_1 q^n = \frac{a_1(1-q^n)}{1-q}; \quad (1)$$

herein, in the above formula (1), q is the adjustment factor and n is the proportion coefficient; when n approaches infinity, the sum of the first n terms tends to be a constant, i.e.

$$\lim_{n \to \infty} \sum_{i=0}^{n} S_n = \frac{a_1}{1-q};$$

The initial value of the component parameters when the component works, and the adjustment factor q (absolute value is less than 1) may be defined according to the sum formula of geometric progression. When the component works, the component parameters may be smoothly adjusted by using formula (1), so that the user experience may be smoothly adjusted until the requirement for the receiving sensitivity of the antenna is met, and the interference of the component on the antenna is reduced. In addition, when the adjustment factor q is a negative number, the adjustment in the opposite direction may be realized to ensure that the component parameters may be adjusted within the preset range [a, b], that is, to ensure that there is no omission in the adjustment of the component parameters.

The match unit 123 is configured to match each of signal strength of the component parameter in the first preset range and the second preset range, and acquire an adjustment factor and a proportion coefficient corresponding to the maximum value of the signal strength.

The adjustment unit 124 is configured to obtain the adjusted component parameter value by calculation according to the initial value acquired by the division unit 121 and the adjustment factor and the proportion coefficient acquired by the match unit 123.

The interference processing apparatus 10 provided in the embodiment of the present disclosure is used to execute the interference processing method provided in the embodiment of FIG. 3 of the present disclosure, and has corresponding functional modules. Its implementation principle and technical effect are similar, and will not be described here again.

Figure 8:
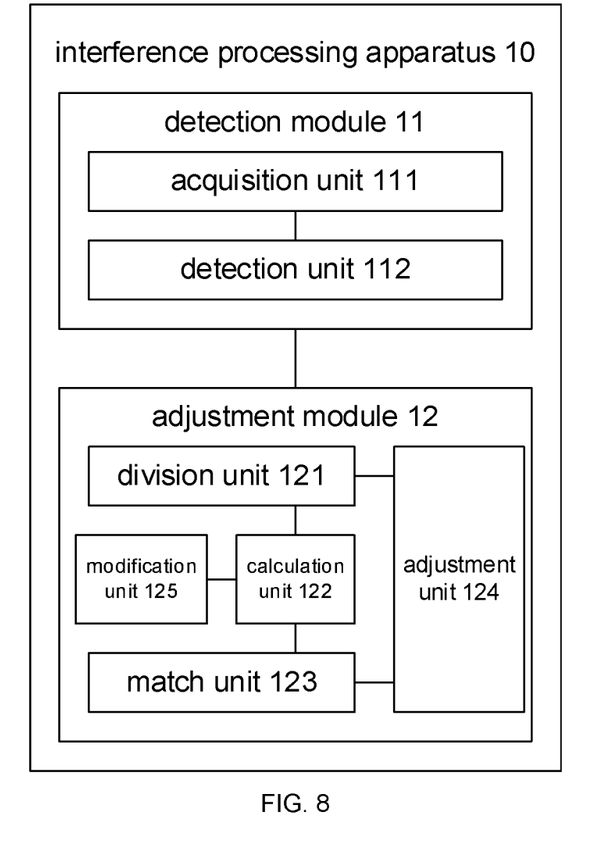
FIG. 8 is a schematic structural diagram of an interference processing apparatus according to an embodiment of the present disclosure.

FIG. 8 is a schematic structural diagram of yet another interference processing apparatus according to an embodiment of the present disclosure. On the basis of the embodiment shown in FIG. 7, the interference processing apparatus 10 in this embodiment may further include: a modification unit 125, configured to modify the adjustment factor when the parameter value calculated by the calculation unit is not within the preset range; and the calculation unit 122 is further configured to traverse all proportional coefficients of the component parameter in the first preset range and the second preset range respectively using the adjustment factor modified by the modification unit 125 and the sum formula of geometric progression, and calculate the parameter value for each proportional coefficient and the signal strength for each parameter value.

The implementation of dynamic adjustment of component parameters by the adjustment module 12 in the embodiment of the present disclosure has been described in detail in the embodiment shown in FIG. 4 above, so it will not be repeated here.

In practical applications, the detection module 11 and the adjustment module 12 in the embodiments shown in FIG. 5 to FIG. 8 of the present disclosure may be implemented by a processor of a terminal equipment, which may be, for example, a central processing unit (short for: CPU), an application specific integrated circuit (short for: ASIC), or one or more integrated circuits for implementing the embodiments of the present disclosure.

Figure 9:
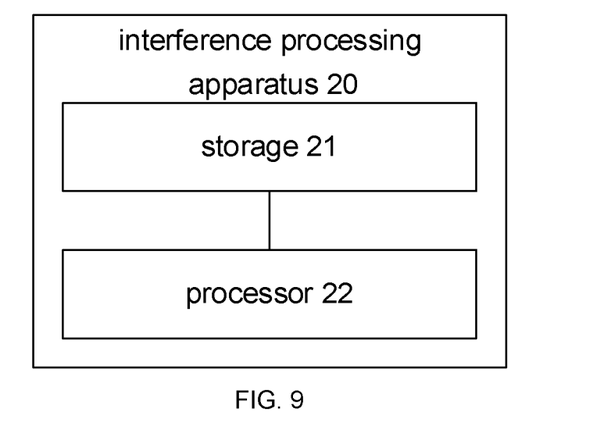
FIG. 9 is a schematic structural diagram of an interference processing apparatus according to an embodiment of the present disclosure.

FIG. 9 is a schematic structural diagram of yet another interference processing apparatus according to an embodiment of the present disclosure. The interference processing apparatus 20 provided by the embodiment of the present disclosure may include: a storage 21 and a processor 22. The storage 21 is configured to store executable instructions; the processor 22 is configured to execute the executable instructions stored in the storage 21 to perform the following operations of: S31, detecting an interference degree of a component of a terminal equipment to the terminal equipment when the component is working; S32, adjusting component parameters corresponding to the component within a preset range when the interference degree satisfies a preset condition.

In some embodiments, when the processor 22 executes the executable instructions, the implementation of the operation S31 may include: S311, acquiring a first signal strength of the component before working and a second signal strength of the component when it is working; S312, calculating the interference degree of the component to the terminal equipment when the component is working, the interference degree being a difference between the second signal strength and the first signal strength.

In some embodiments, when the processor 22 executes the executable instructions, the implementation of the operation S32 may include: when the difference between the second signal strength and the first signal strength is less than a preset signal threshold, determining an adjusted component parameter value according to a signal strength corresponding to a parameter value of each of the component parameters within the preset range.

In some embodiments, when the processor 22 executes the executable instructions, the implementation of the operation S32 may further include: when the difference between the second signal strength and the first signal strength is less than a preset signal threshold value, traversing all parameter values of the component parameters within the preset range, acquiring a signal strength for each of the parameter values, and using a parameter value corresponding to a maximum value of the signal strength as the adjusted component parameter value.

In some embodiments, the preset range is a range from a minimum value to a maximum value for a normal operation of the component. When the processor 22 executes the executable instructions, the implementation of the operation S32 may further include: S321, when the difference between the second signal strength and the first signal strength is less than a preset signal threshold, using an intermediate value within the preset range as an initial value of the component parameter, and dividing the preset range into a first preset range from the minimum value to the initial value and a second preset range from the initial value to the maximum value; S322, traversing each proportional coefficient of the component parameter in the first preset range and the second preset range respectively using a predetermined adjustment factor and a sum formula of geometric progression, and calculating a parameter value for each proportional coefficient and a signal strength for each parameter value; S323, matching each of signal strength of the component parameter in the first preset range and the second preset range, acquiring an adjustment factor and a proportion coefficient corresponding to the maximum value of the signal strength; S324, obtaining the adjusted component parameter value by calculation according to the initial value, the acquired adjustment factor and the acquired proportion coefficient.

In some embodiments, when the processor 22 executes executable instructions, after executing operation S322, the processor 22 also performs the following operations of: modifying the adjustment factor when the calculated parameter value is not within the preset range; traversing all proportional coefficients of the component parameter in the first preset range and the second preset range respectively using the modified adjustment factor and the sum formula of geometric progression, and calculating the parameter value for each proportional coefficient and the signal strength for each parameter value.

The embodiment of the present disclosure also provides a computer-readable storage medium, which stores computer-executable instructions, and when the processor executes the computer-executable instructions, it performs the following operations: S41, detecting an interference degree of a component of a terminal equipment to the terminal equipment when the component is working; S42, adjusting component parameters corresponding to the component within a preset range when the interference degree satisfies a preset condition.

In some embodiments, when the processor executes the computer-executable instruction, the implementation of operation S41 may include: S411, acquiring a first signal strength of the component before working and a second signal strength of the component when it is working; S412, calculating the interference degree of the component to the terminal equipment when the component is working, the interference degree being a difference between the second signal strength and the first signal strength.

In some embodiments, when the processor executes the computer-executable instruction, the implementation of operation S42 may include: when the difference between the second signal strength and the first signal strength is less than a preset signal threshold, determining an adjusted component parameter value according to a signal strength corresponding to a parameter value of each of the component parameters within the preset range.

In some embodiments, when the processor executes the executable instructions, the implementation of the operation S42 may further include: when the difference between the second signal strength and the first signal strength is less than a preset signal threshold value, traversing all parameter values of the component parameter within the preset range, acquiring a signal strength for each of the parameter values, and using a parameter value corresponding to a maximum value of the signal strength as the adjusted component parameter value.

In some embodiments, when the processor executes the executable instructions, the implementation of the operation S42 may further include: S421, when the difference between the second signal strength and the first signal strength is less than a preset signal threshold, using an intermediate value within the preset range as an initial value of the component parameter, and dividing the preset range into a first preset range from the minimum value to the initial value and a second preset range from the initial value to the maximum value; S422, traversing each proportional coefficient of the component parameter in the first preset range and the second preset range respectively with a predetermined adjustment factor and a sum formula of geometric progression, and calculating a parameter value for each proportional coefficient and a signal strength for each parameter value; S423, matching each of signal strength of the component parameter in the first preset range and the second preset range, acquiring an adjustment factor and a proportion coefficient corresponding to the maximum value of the signal strength; S424, obtaining the adjusted component parameter value by calculation according to the initial value, the acquired adjustment factor and the acquired proportion coefficient.

In some embodiments, when the processor executes executable instructions, after executing operation S422, the processor also performs the following operations: modifying the adjustment factor when the calculated parameter value is not within the preset range; traversing all proportional coefficients of the component parameter in the first preset range and the second preset range respectively using the modified adjustment factor and the sum formula of geometric progression, and calculating the parameter value for each proportional coefficient and the signal strength for each parameter value.

It may be understood by those of ordinary skill in the art that all or part of the steps in the above method may be completed by instructing related hardware (such as processor) through a program, which may be stored in a computer-readable storage medium, such as a read-only memory, a disk, an optical disc, etc. Alternatively, all or part of the steps of the above embodiments may also be implemented using one or more integrated circuits. Accordingly, each module/unit in the above embodiment may be implemented in the form of hardware, such as an integrated circuit to realize its corresponding function, or in the form of a software function module, such as a processor to execute a program/instruction stored in a storage to realize its corresponding function. The embodiments of the present disclosure are not limited to the combination of hardware and software in any particular form.

Although the disclosed embodiments of the present disclosure have been described above, the contents are only for the convenience of understanding the embodiments adopted in the disclosure and are not intended to limit the present disclosure. Any person skilled in the art of the disclosure may make any modification and change in the form and details of the implementation without departing from the spirit and scope disclosed in the disclosure, but the scope of patent protection of the disclosure shall still be subject to the scope defined in the appended claims.

What is claimed is:

1. An interference processing method, comprising:
   detecting an interference degree of a component of a terminal equipment to the terminal equipment when the component is working; and
   adjusting component parameters corresponding to the component within a preset range when the interference degree satisfies a preset condition;
   wherein, detecting the interference degree of the component of the terminal equipment to the terminal equipment when the component is working comprises:
   acquiring a first signal strength of the component before working and a second signal strength of the component when it is working;
   calculating the interference degree of the component to the terminal equipment when the component is working, the interference degree being a difference between the second signal strength and the first signal strength;
   wherein, adjusting component parameters corresponding to the component within the preset range when the interference degree satisfies the preset condition, comprises:
   when the difference between the second signal strength and the first signal strength is less than a preset signal threshold, determining an adjusted component parameter value according to a signal strength corresponding to a parameter value of each of the component parameters within the preset range.

2. The interference processing method according to claim 1, wherein, determining the adjusted component parameter value according to the signal strength corresponding to the parameter value of each of the component parameters within the preset range comprises:
   traversing all parameter values of the component parameters within the preset range, acquiring a signal strength for each of the parameter values, and using a parameter value corresponding to a maximum value of the signal strength as the adjusted component parameter value.

3. The interference processing method according to claim 2, wherein, the preset range is a range from a minimum value to a maximum value for a normal operation of the component, and traversing all parameter values of the component parameters within the preset range, acquiring the signal strength for each of the parameter values, and using the parameter value corresponding to the maximum value of the signal strength as the adjusted component parameter value comprises:
   using an intermediate value within the preset range as an initial value of the component parameter, and dividing the preset range into a first preset range from the minimum value to the initial value and a second preset range from the initial value to the maximum value;
   traversing each proportional coefficient of the component parameter in the first preset range and the second preset range respectively using a predetermined adjustment factor and a sum formula of geometric progression, and calculating a parameter value for each proportional coefficient and a signal strength for each parameter value, wherein the sum formula of geometric progression is:

$$\sum_{i=0}^{n} S_n = a_1 + a_1 q + a_1 q^2 + L + a_1 q^n = \frac{a_1(1-q^n)}{1-q}$$

wherein, q is the adjustment factor and n is the proportion coefficient;
   matching each of signal strength of the component parameter in the first preset range and the second preset range, acquiring an adjustment factor and a proportion coefficient corresponding to the maximum value of the signal strength;
   obtaining the adjusted component parameter value by calculation according to the initial value, the acquired adjustment factor and the acquired proportion coefficient.

4. The interference processing method according to claim 3, wherein, after calculating the parameter value for each proportional coefficient, the method further comprises:
   modifying the adjustment factor when the calculated parameter value is not within the preset range;
   traversing all proportional coefficients of the component parameter in the first preset range and the second preset range respectively using the modified adjustment factor and the sum formula of geometric progression, and calculating the parameter value for each proportional coefficient and the signal strength for each parameter value.

5. An interference processing apparatus, comprising: a storage and a processor;
   the storage is configured to store executable instructions; and
   the processor is configured to execute the executable instructions stored in the storage, to perform the following operations:
   detecting an interference degree of a component of a terminal equipment to the terminal equipment when the component is working; and
   adjusting component parameters corresponding to the component within a preset range when the interference degree satisfies a preset condition;
   wherein, detecting the interference degree of the component of the terminal equipment to the terminal equipment when the component is working comprises:

acquiring a first signal strength of the component before working and a second signal strength of the component when it is working;

calculating the interference degree of the component to the terminal equipment when the component is working, the interference degree being a difference between the second signal strength and the first signal strength;

adjusting component parameters corresponding to the component within the preset range when the interference degree satisfies the preset condition comprises:

when the difference between the second signal strength and the first signal strength is less than a preset signal threshold, determining an adjusted component parameter value according to a signal strength corresponding to a parameter value of each of the component parameters within the preset range.

6. The interference processing apparatus according to claim 5, wherein, adjusting component parameters corresponding to the component within the preset range when the interference degree satisfies the preset condition, comprises:

when the difference between the second signal strength and the first signal strength is less than a preset signal threshold, determining an adjusted component parameter value according to a signal strength corresponding to a parameter value of each of the component parameters within the preset range.

7. The interference processing apparatus according to claim 6, wherein, determining the adjusted component parameter value according to the signal strength corresponding to the parameter value of each of the component parameters within the preset range comprises:

traversing all parameter values of the component parameters within the preset range, acquiring a signal strength for each of the parameter values, and using a parameter value corresponding to a maximum value of the signal strength as the adjusted component parameter value.

8. The interference processing apparatus according to claim 7, wherein, the preset range is a range from a minimum value to a maximum value for a normal operation of the component, and traversing all parameter values of the component parameters within the preset range, acquiring the signal strength for each of the parameter values, and using the parameter value corresponding to the maximum value of the signal strength as the adjusted component parameter value comprises:

using an intermediate value within the preset range as an initial value of the component parameter, and dividing the preset range into a first preset range from the minimum value to the initial value and a second preset range from the initial value to the maximum value;

traversing each proportional coefficient of the component parameter in the first preset range and the second preset range respectively using a predetermined adjustment factor and a sum formula of geometric progression, and calculating a parameter value for each proportional coefficient and a signal strength for each parameter value, wherein the sum formula of geometric progression is:

$$\sum_{i=0}^{n} S_n = a_1 + a_1 q + a_1 q^2 + L + a_1 q^n = \frac{a_1(1 - q^n)}{1 - q}$$

wherein, q is the adjustment factor and n is the proportion coefficient;

matching each of signal strength of the component parameter in the first preset range and the second preset range, acquiring an adjustment factor and a proportion coefficient corresponding to the maximum value of the signal strength;

obtaining the adjusted component parameter value by calculation according to the initial value, the acquired adjustment factor and the acquired proportion coefficient.

9. The interference processing apparatus according to claim 8, wherein, after calculating the parameter value for each proportional coefficient, the method further comprises:

modifying the adjustment factor when the calculated parameter value is not within the preset range;

traversing all proportional coefficients of the component parameter in the first preset range and the second preset range respectively using the modified adjustment factor and the sum formula of geometric progression, and calculating the parameter value for each proportional coefficient and the signal strength for each parameter value.

10. A non-transitory computer-readable storage medium storing computer executable instructions which, when executed by a processor, cause the processor to perform an interference processing method comprising:

detecting an interference degree of a component of a terminal equipment to the terminal equipment when the component is working; and adjusting component parameters corresponding to the component within a preset range when the interference degree satisfies a preset condition;

wherein, detecting the interference degree of the component of the terminal equipment to the terminal equipment when the component is working comprises:

acquiring a first signal strength of the component before working and a second signal strength of the component when it is working;

calculating the interference degree of the component to the terminal equipment when the component is working, the interference degree being a difference between the second signal strength and the first signal strength;

wherein, adjusting component parameters corresponding to the component within the preset range when the interference degree satisfies the preset condition, comprises:

when the difference between the second signal strength and the first signal strength is less than a preset signal threshold, determining an adjusted component parameter value according to a signal strength corresponding to a parameter value of each of the component parameters within the preset range.

* * * * *

UNITED STATES PATENT AND TRADEMARK OFFICE
CERTIFICATE OF CORRECTION

PATENT NO. : 11,115,072 B2  
APPLICATION NO. : 16/641227  
DATED : September 7, 2021  
INVENTOR(S) : Haibing Jin Page 1 of 1

It is certified that error appears in the above-identified patent and that said Letters Patent is hereby corrected as shown below:

On the Title Page

The Left Column, Item (73), under "Assignee" reads:  
"XI'AN ZHONGXING NEW SOFTWARE CO. LTD., Xi'an (CN)"  
Should Read:  
"XI'AN ZHONGXING NEW SOFTWARE CO., LTD., Xi'an (CN)"

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*